United States Patent [19]
Martin

[11] Patent Number: 5,867,244
[45] Date of Patent: Feb. 2, 1999

[54] AUXILIARY CLIP-ON EYEGLASSES FOR MOUNTING ON CONVENTIONAL EYEGLASSES

[75] Inventor: Gary Martin, Van Nuys, Calif.

[73] Assignee: Revolution Eyewear, Van Nuys, Calif.

[21] Appl. No.: 510,797

[22] Filed: Aug. 3, 1995

[51] Int. Cl.$^6$ ........................................... G02C 9/00
[52] U.S. Cl. .................................. 351/47; 351/44; 351/57
[58] Field of Search ................................. 351/47, 57, 48, 351/58, 41, 44, 158

[56] References Cited

U.S. PATENT DOCUMENTS 4,824,234  4/1989  Sparks et al. ............................. 351/47

FOREIGN PATENT DOCUMENTS 726650  3/1956  United Kingdom ..................... 351/57

Primary Examiner—Hung X. Dang
Attorney, Agent, or Firm—David O'Reilly

[57] ABSTRACT

A method and apparatus for installing auxiliary clip-on eyewear on conventional glasses. Auxiliary clip-on eyewear is comprised of three very simple clips that engage the frame on conventional eyewear to hold the auxiliary eyewear on the conventional frames without the need for any type of tensioning devices or using multiple clips. Outboard clips fit around the conventional frame circumjacent the temple blocks. A third tensioning clip, mounted on the auxiliary eyewear, fits beneath and engages the bridge on the conventional glasses. A downward force applied by the center bridge mounted clip maintains the outboard clips on the conventional frame. With the arrangement on the preset invention, an auxiliary lens frame having a design conforming to the conventional lens is nearly undetectable when mounted.

14 Claims, 1 Drawing Sheet

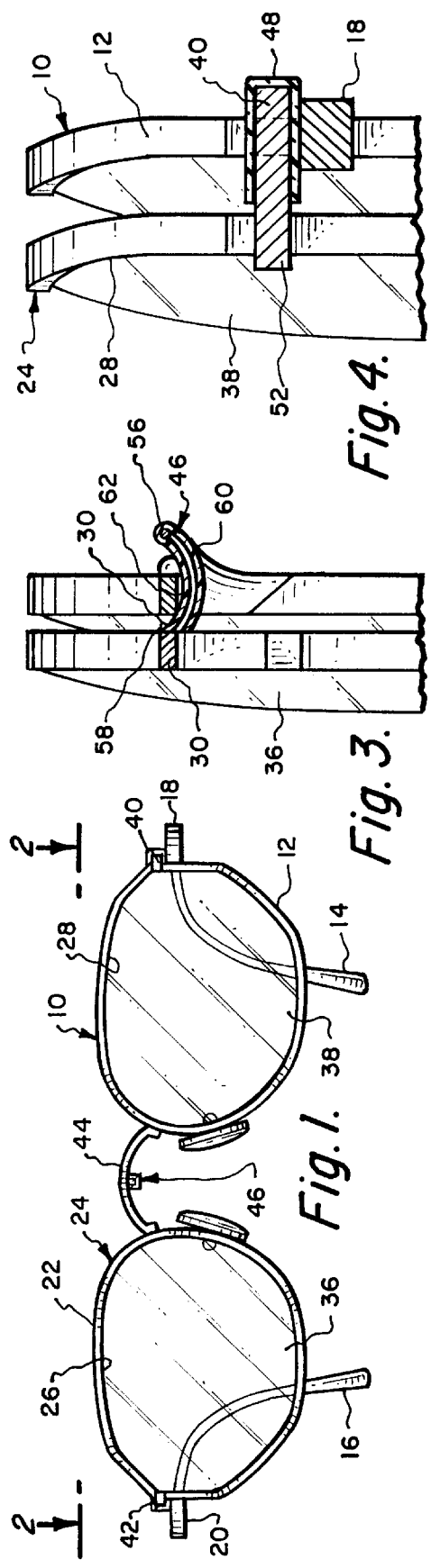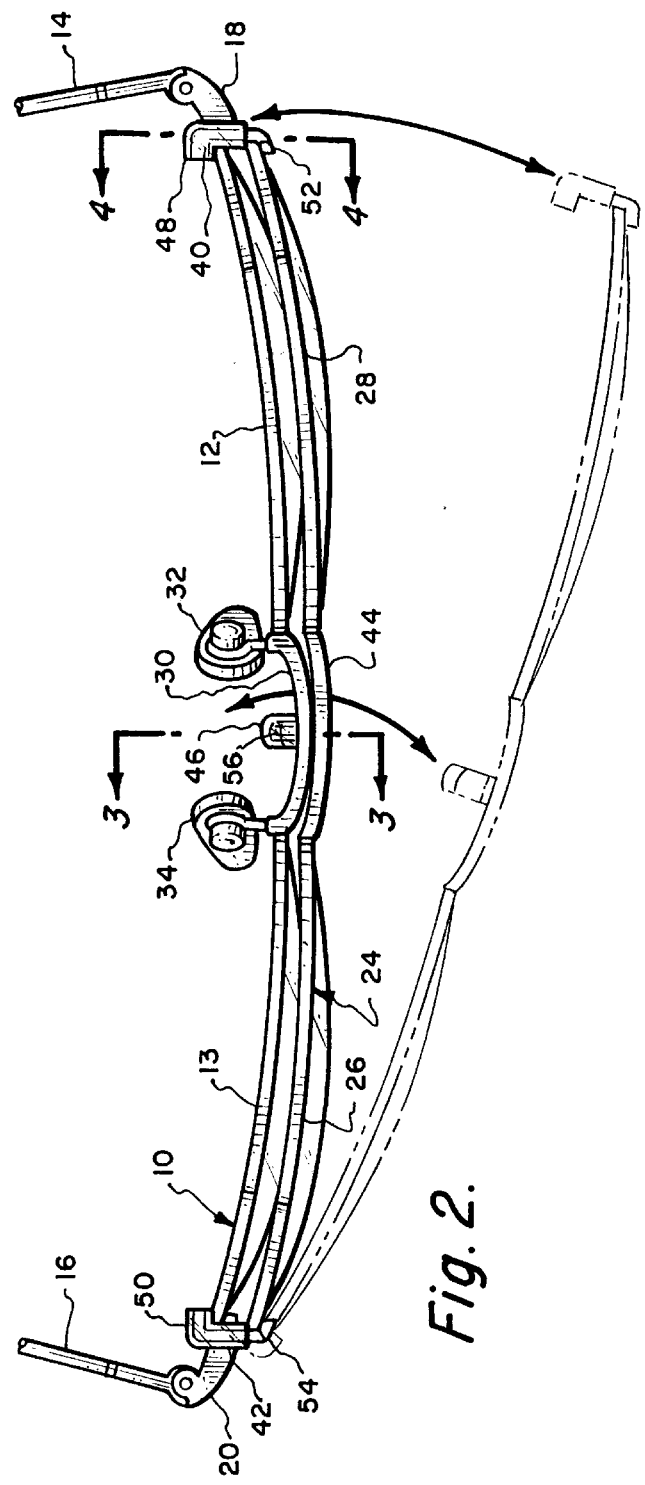

AUXILIARY CLIP-ON EYEGLASSES FOR MOUNTING ON CONVENTIONAL EYEGLASSES

BACKGROUND OF THE INVENTION

1. Field of the Invention

This invention relates to clip-on eyewear, and more particularly relates to a simple auxiliary clip-on frame for converting conventional eyewear to sunglasses.

2. Background Information

Clip-on eyewear to convert conventional eyewear to sunglasses are very popular. They allow the user to avoid the need for two separate prescription lenses. They can also be used, but less frequently, to clip-on eyewear that might change the prescription of the lenses. However, the more common use would be to add tinted lenses to conventional eyewear.

A number of different designs are available for clip-on eyewear, The most popular is in the form of a frame having a tensioning bar spanning the bridge and a number of clips on each lens frame to clip the additional lens on conventional eyewear. Clips, provided at the top and bottom of each lens frame and in some cases an additional clip on the bottom interior of each frame near the opening for the nose rest, are provided to clip the additional sunglasses on a conventional frame. The tension or torsion bar, spanning the bridge, applies tension to hold the clips on the frame of the conventional lens. The additional torsion bar detracts from the aesthetic appearance of the lens, adds additional weight and generally changes the appearance of the wearer's conventional eyewear.

Another type of clip-on device has a hinged latch that fits over the bridge to latch the additional lenses on the frame. Generally these particular lenses are made of inexpensive plastic materials and have a "cheap" appearance that detracts from attractive conventional eyewear. It would be advantageous if a clip-on lens could be provided that was simple and easy to use, and didn't detract from the attractiveness of the wearer's conventional glasses.

It is therefore, one object of the present invention to provide clip-on eyewear that easily and quickly clips on conventional glasses and has minimal impact on the appearance of the eyewear.

Yet another object of the present invention is to provide clip-on eyewear that eliminates the need for any type of tensioning device to hold the clip-on eyewear on conventional glasses.

Still another object of the present invention is to provide clip-on eyewear that clips on easily and quickly with only three unobtrusive clips.

Yet another object of the present invention is to provide a clip-on eyewear that clips on conventional eyewear with two clips adjacent the block portion or temples of the frame and a single clip that fits beneath the bridge of the conventional eyewear.

BRIEF DESCRIPTION OF THE INVENTION

This invention relates to clip-on eyewear, and more particularly relates to clip-on eyewear having a simple clip-on arrangement of three clips to mount the clip-on eyewear on conventional glasses.

The clip-on eyewear of the present invention is comprised of a frame that is constructed to match the frame of the user, having a minimum of three simple clips that hold the auxiliary frame on the frame of the conventional glasses. The construction and design eliminates the need for any type of tensioning devices to hold the auxiliary frame on the frame of the conventional glasses. This arrangement is provided by a pair of lens frames joined by a flexible bridge and a single reversed clip that engages the bridge of the conventional glasses to exert a force to hold the frames on the conventional eyewear. This makes the clip-on eyewear simple and easy to attach while it is firmly held on the conventional frame.

In the preferred embodiment, two outboard clips on the auxiliary frame extend around the blocks of the conventional frame, just above and adjacent to where the temples attach. However, these clips could be anywhere in the upper outer quadrant of each lens frame.

A third clip is attached, preferably at a level above the outboard clips, to the bridge joining the two lenses of the auxiliary frame. This clip faces upward and somewhat opposes the direction of the clips that mount around the conventional eyewear blocks. The clip fits beneath and exerts and upward force on the bridge to provide tension to hold the outer clips against the sides of the conventional glass eyewear frame. In the preferred embodiment of the invention the center clip, mounted on the bridge, extends around the bridge of the conventional glasses to assist in holding them onto the conventional frame.

Preferably, the clip-on eyewear has a frame that is identical in shape and design as the conventional eyewear so that when mounted, it is nearly undetectable to an observer and doesn't detract from the aesthetic appearance of the wearer's conventional glasses.

The above and other novel features and advantages of the invention will be more fully understood from the following detailed description and the accompanying drawings, in which:

BRIEF DESCRIPTION OF THE DRAWINGS

FIG. 1 is a front elevation of conventional eyewear with attached clip-on eyewear constructed according to the invention.

FIG. 2 a top view taken at 2—2 of FIG. 1 illustrating the construction and mounting of the auxiliary eyewear.

FIG. 3 is a sectional view taken at 3—3 of FIG. 2 to illustrate the center mount clip that applies tension to hold the auxiliary eyewear on the conventional eyewear frame.

FIG. 4 is a sectional view illustrating the construction and arrangement of the outer clips around the conventional eyewear block.

DETAILED DESCRIPTION OF THE INVENTION

Conventional eyewear 10 is shown generally in FIG. 1 and is comprised of a designer frame 12, temples 14 and 16 to hold the glasses on a wearer's head by extending over the ears and temple mounts or blocks 18 and 20. FIG. 1 also illustrates the aesthetically appealing appearance of the auxiliary eyewear since it will be nearly undetectable to an observer.

Preferably, frame 22 of auxiliary eyewear 24 is constructed to match the design of the wearer's own conventional eyewear. That is, each lens frame 26 and 28 is a perfect match for the frame of the conventional eyewear. This means, that when auxiliary eyewear 24 is mounted on conventional lens frame 10, it is nearly undetectable and maintains the aesthetic appeal of the wearer's own eyeglasses.

As shown in FIG. 2, conventional eyewear 10 is comprised of lens frames 12 and 13 having appropriate prescription lenses, temples 14 and 16 and temple blocks 18 and 20 mounted on the outboard portion of conventional lens frames 12 and 13. Lens frames 12 and 13 are joined by bridge 30 and generally include nose rests 32 and 34.

Auxiliary frame 24 is comprised of lens frames 26 and 28, which in the case of eyeglasses, will contain tinted lenses 36 and 38 (FIG. 1). The use of clip-on lenses is appealing because conventional non-prescription tinted lenses 36 and 38 can be used without the need for any special prescription. This can reduce the expense as well as the inconvenience of carrying additional prescription sunglasses. Optionally, lenses 36 and 38 could be prescription lenses that change or improve the prescription of the conventional lenses in conventional frame 24.

Auxiliary frames 24 use a unique arrangement that eliminates the need for any special clips, torsion mechanisms or springs to hold the auxiliary lenses on conventional frame 10. Preferably, auxiliary eyewear 24 has a pair of outboard clips 40 and 42 that clip around conventional eyewear 10, frames 12 and 13 immediately adjacent and above temple blocks 18 and 20. A bridge 44 connects auxiliary eyewear frames 26 and 28. A third tensioning clip 46 is constructed to fit beneath the bridge 30 of conventional eyewear 10. Bridge tensioning clip 46 is constructed so that a downward force is applied to maintain outer clips 40 and 42 in firm contact with frames 12 and 13 of conventional eyewear 10. Tensioning clip 46 is preferably at a level that is above outboard clips 40 and 42 when the auxiliary frame is mounted on a conventional frame, but is not required.

Auxiliary eyewear 24 is simple and easy to install or remove. One of the outboard clips, 40 or 42, is first mounted on conventional eyewear frame 12 or 13. Bridge tensioning clip 46 is then passed beneath bridge 30 on conventional eyewear 10. A slight upward force on the frame, on the side opposite from the clip that is engaged, allows it to be lifted up and around the side of frames 12 or 13 of conventional eyewear 10. Thus, auxiliary eyewear 24 is easily mounted and demounted with simple motion of mounting one clip, slipping the center clip beneath the bridge and then lifting and dropping the other clip around conventional eyewear frame 10. Removal is achieved by simply reversing this process. One side of auxiliary eyewear 24 is lifted to remove the clip from around the block area and the remaining clips simply fall away.

Preferably outboard clips 40 and 42 are covered with resilient sleeve 48 and 50 to apply some gripping force to conventional lens frames 12 and 13, and prevent scarring the frames. Outboard clips 40 and 42 can be in the form of thin stainless steel bars welded to frames 26 and 28 at 52 and 54.

Bridge mounted tensioning clip 46 is preferably a thin wire 56 securely welded at 58 to bridge 30, bent into a "U" shape, as shown in FIG. 2, and covered with resilient sleeve 60. Preferably, bridge mounted clip 46 has a slightly arcuate shape at 62 to engage bridge 30 applying a tensioning force to maintain contact of outboard clips 40 and 42 with conventional eyewear frame 10.

Outboard clips 40 and 42 can be anywhere on the upper and outer quadrant of auxiliary lens frames 26 and 28, but are preferably below the level of center bridge mounted tensioning clip 46. That is, outboard clips 40 and 42 are preferably just above temple blocks 18 and 20 so that maximum tension is applied by center bridge mounted clip 46. This downward tension on the center clip maintains the position of outboard clips 40 and 42 around the frame of conventional eyeglasses 10.

Thus, there has been disclosed unique auxiliary clip-on eyewear that is simple and easy to use. Only three clips are necessary to maintain and hold the auxiliary eyewear on a conventional frame. Outboard clips, fitting around the conventional eyewear frame adjacent to the temple blocks, are held in place by a bridge mounted center tensioning clip that fits beneath the bridge on the conventional eyewear frames. They are installed or removed by clipping one clip around the block and then the center clip on the bridge of the conventional frame with a slight tension applied to position the other clip. Removal is a simple reversal of this procedure.

This invention is not to be limited by the embodiment shown in the drawings and described in the description which is given by way of example and not of limitation, but only in accordance with the scope of the appended claims.

What is claimed is:

1. Auxiliary clip-on eyeglasses comprising; first and second lens frames;

at least one clip mounted on said first frame constructed and arranged to fit on one frame of a conventional eyeglass lens frame;

at least one other clip mounted on said second frame constructed and arranged to fit on the other frame of a conventional eyeglass lens frame;

said at least one clip and said at least one other clip engaging said first and second frame respectively of said conventional eyeglass lens frame circumjacent to and above temple blocks of said conventional eyeglass lens frame;

clip means on a flexible bridge between said first frame and said second frame constructed and arranged to fit and clip on a bridge of said conventional eyeglass lens frame, said clip means when clipped on said bridge applying a force in opposition to said at least one clip and said at least one other clip when mounted on said conventional eyeglass lens frame;

whereby a tension force is applied to said auxiliary clip on eyeglasses to firmly hold them on said conventional eyeglass lens frame.

2. The auxiliary eyewear according to claim 1 in which said clip means is a bridge mounted clip that is above the level of at least one clip and said at least one other when said auxiliary clip-on eyewear is mounted on said conventional lens frame.

3. The auxiliary lens frame according to claim 2 in which said clip means on said flexible bridge has an upward arcuate shape for engaging and partially fitting around a bridge on said conventional lens frame.

4. The auxiliary lens frame according to claim 2 including resilient non-slip means covering each of said clips.

5. The auxiliary lens frame according to claim 4 in which said resilient non-slip means comprises a resilient plastic sleeve fitting over the end of each of said clips.

6. The auxiliary eyewear according to claim 1 in which said first and second clips are welded to said first and second lens frames respectively.

7. The auxiliary eyewear according to claim 6 in which said first and second clips are mounted on said first and second lens frames in the upper outermost quadrant of each respective lens frame.

8. The auxiliary lens frame according to claim 1 in which said auxiliary lens frame is constructed of stainless steel.

9. Clip-on eyeglasses adapted to be mounted on conventional eyeglasses having a pair of lens connected by a bridge comprising;

a first lens frame;

a second lens frame;

a flexible bridge member joining said first and second lens;

a first mounting clip located on an outboard edge of said first lens frame;

a second mounting clip located on an outboard edge of said second lens frame;

said first and second mounting clip engaging first and second lens of said conventional eyeglasses circumjacent to and above temple blocks of said conventional eyeglasses;

reversed clip means formed on said flexible bridge member, constructed and arranged to engage and fit on said bridge of said conventional eyeglasses;

said reversed clip means formed on said flexible bridge member cooperating with said first mounting clip and second mounting clip to firmly hold said clip on eyeglasses on said conventional eyeglasses.

10. The clip-on eyeglasses according to claim 9 in which said first and second clips are secured to said first and second frames and extend rearwardly thereof.

11. The auxiliary lens frame according to claim 10 in which said protective covering is resilient non-slip means covering each of said clips.

12. The auxiliary lens frame according to claim 11 in which said resilient non-slip means comprises a resilient plastic sleeve fitting over the end of each of said clips.

13. The clip-on eyeglasses according to claim 9 in which said first and second clip have a protective covering.

14. The clip-on eyeglasses according to claim 13 in which said protective covering is a resilient plastic protective covering.

* * * * *